United States Patent
Schmitz et al.

[11] Patent Number: 6,114,949
[45] Date of Patent: Sep. 5, 2000

[54] STEERING WHEEL WITH OPTO-ELECTRONIC SENSOR

[75] Inventors: Stephan Schmitz, Rheine; Achim Pruksch, Neudenau; Alain Gaillard, Karlsruhe, all of Germany

[73] Assignee: Robert Bosch GmbH, Stuttgart, Germany

[21] Appl. No.: 09/043,802

[22] PCT Filed: Jul. 9, 1997

[86] PCT No.: PCT/DE97/01442

§ 371 Date: Mar. 25, 1998

§ 102(e) Date: Mar. 25, 1998

[87] PCT Pub. No.: WO98/05543

PCT Pub. Date: Feb. 12, 1998

[30] Foreign Application Priority Data

Aug. 3, 1996 [DE] Germany .......................... 196 31 502

[51] Int. Cl.[7] .................................................. B60Q 1/00
[52] U.S. Cl. ................ 340/425.5; 340/531; 250/227.11; 250/227.14; 307/10.1
[58] Field of Search ................................ 340/425.5, 426, 340/531; 280/735; 250/215, 227.11, 227.14, 551; 307/10.1

[56] References Cited

U.S. PATENT DOCUMENTS

| 4,158,191 | 6/1979 | Rogers et al. | 280/735 |
| 4,438,425 | 3/1984 | Tsuchida et al. | 307/10.1 |
| 4,456,903 | 6/1984 | Kishi et al. | 307/10.1 |
| 4,672,214 | 6/1987 | Takahashi et al. | 250/551 |
| 4,678,906 | 7/1987 | Rudi et al. | 250/227 |
| 4,772,799 | 9/1988 | Inui et al. | 250/551 |

FOREIGN PATENT DOCUMENTS

| 33 11 524 A1 | 10/1984 | Germany . |
| 62-198545 | 2/1987 | Japan . |
| 1381947 | 1/1975 | United Kingdom . |

*Primary Examiner*—Julie Lieu
*Attorney, Agent, or Firm*—Michael J. Striker

[57] ABSTRACT

A steering wheel (10) is proposed, especially for controlling a motor vehicle, which is provided with a device that detects the elastic deformation of the sheath of the steering wheel (10) caused by its being gripped by the driver, and which controls vehicle-specific functions on the basis of this deformation. To that end, a fiber-optical sensor is mounted on the steering wheel (10). This sensor has an optical fiber (14), into which a transmitter (16) injects a light signal (16.1), which is received by a pickup (18). Exertions of pressure or force on the optical fiber (14) cause a change in polarization of the light signal (16.1), which is evaluated by an evaluation circuit (15) to form a driver signal (20.x).

10 Claims, 2 Drawing Sheets

STEERING WHEEL WITH OPTO-ELECTRONIC SENSOR

BACKGROUND OF THE INVENTION

The invention is based on a steering wheel the type conventionally known in the art.

From German Patent Disclosure DE 33 11 524 A1, fiber-optical sensors are known that are especially suitable for force and pressure measurements or for monitoring and safety purposes. In an example of an application in automotive engineering, described in this reference, such fiber-optical sensors are mounted in the window frame or in the face end of an electrically actuatable window pane. In this application, the sensors cause the window raising motor to be shut off as soon as the risk of something's being caught in the window, as the window pane moves upward, is detected. This risk is detected by an electronic control unit in that the pressure, exerted in this state, on the optical fiber causes a change in a light signal introduced into it and received by a pickup. This change is evaluated by the control unit and converted into a signal for shutting off the window raising motor.

SUMMARY OF THE INVENTION

By comparison, the invention is based on the concept of using a fiber-optical sensor for the targeted tripping of vehicle-specific functions, such as of the lights, horn, windshield wiper, etc., by the driver. To allow the driver, for safety reasons, to keep his hands on the steering wheel as he actuates these functions, the sensor is suitably disposed on the steering wheel, and particularly on the steering wheel ring. The tripping of the functions is effected by means of a strong pressure pulse exerted by the driver on the steering wheel ring.

In an expanded version of such a sensor system, on the basis of multiple pressure pulses occurring in rapid succession, grip sequences can be defined, by means of which even a plurality of different vehicle-specific devices can be triggered with a single sensor. The switches omitted as a result from the vehicle dashboard make the dashboard easier to read and reduce costs for both parts and assembly while simultaneously increasing driving safety.

On the basis of the basic signal of the fiber-optical sensor that necessarily results from the grip of the driver's hands on the steering wheel, it is possible, parallel to the tripping functions, to monitor the driver at only slight added expense. In this case, monitoring of the steering time or detecting a driver who falls asleep are conceivable. When the vehicle is in motion and there is no grip on the steering wheel, for example because the driver has fallen asleep, an alarm is tripped, or a procedure for stopping the vehicle is initiated.

Further advantages or advantageous refinements will become apparent from the dependent claims or the description.

BRIEF DESCRIPTION OF THE DRAWINGS

The invention is described in further detail in the ensuing description of an exemplary embodiment shown in the drawing.

DESCRIPTION OF THE PREFERRED EMBODIMENT

Figure 1:
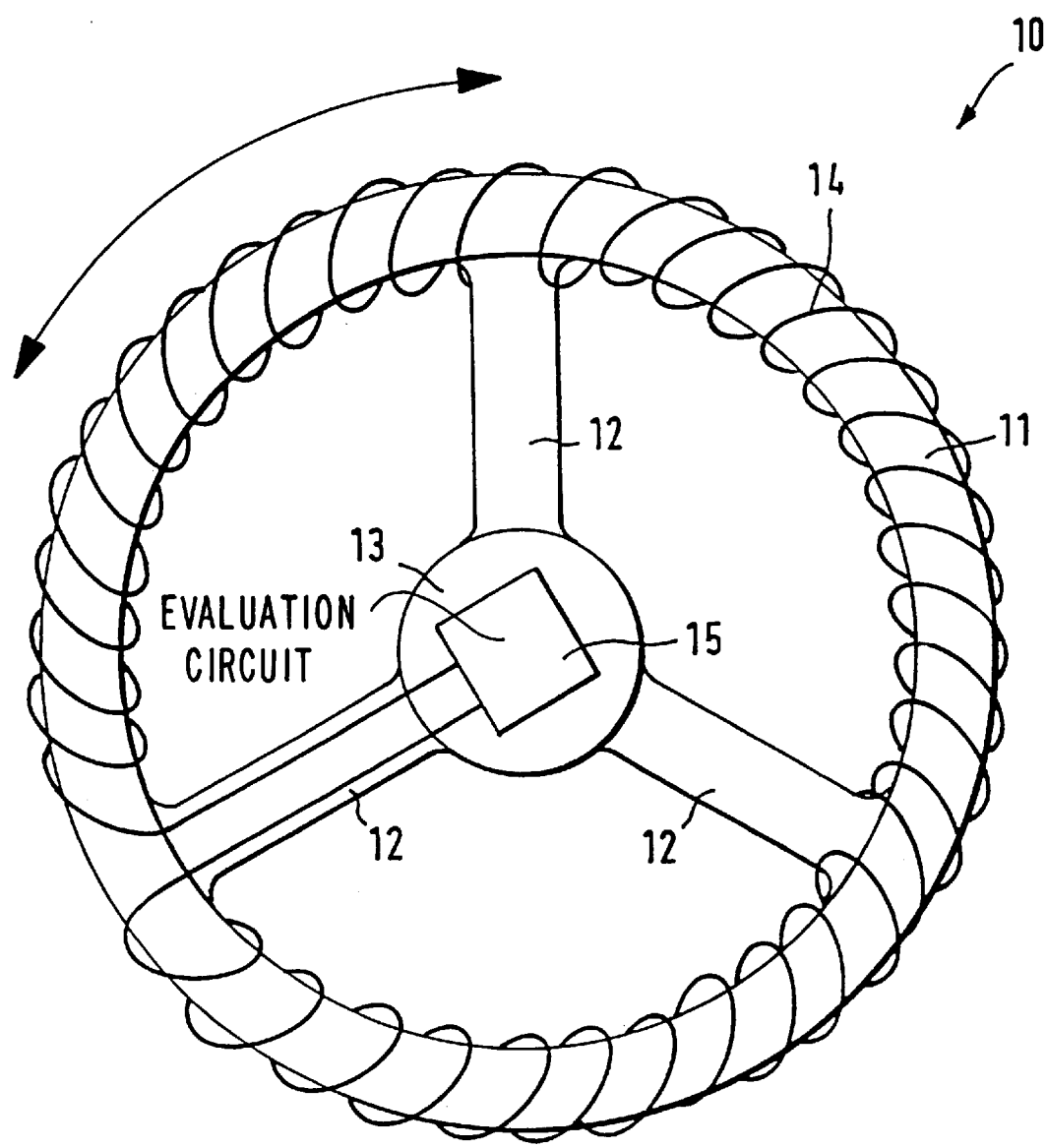
FIG. 1 in simplified form shows the disposition of fiber-optical sensors and the evaluation circuit on a steering wheel.

The steering wheel 10 shown in FIG. 1 has a ring-shaped steering wheel ring 11, which is joined via a plurality of radially extending steering wheel spokes 12 to a centrally disposed steering wheel hub 13. An optical fiber 14, which covers the entire circumference of the steering wheel ring 11, is wound in a spiral around the steering wheel ring 11. The two ends of the optical fiber 14 extend parallel along the spokes 12 to the hub 13. A transmitter 16, not visible here, is disposed on the first end of the optical fiber, and its transmitted light signal is received by a pickup 18, also not shown. The transmitter 16 and the pickup 18 are integrated into an evaluation circuit 15, which processes the received light signals into a driver signal 20.

In a departure from the arrangement described above, it would also be possible for only defined portions of the circumference of the steering wheel ring 11 to be wrapped by the optical fiber, or in addition or alternatively for both the spokes 12 and the ring 11 to be so wrapped. A disposition of the evaluation circuit 15 that is not coupled to the steering wheel 10 would also be conceivable.

A sheath of the steering wheel 10 is not shown; it surrounds the optical fiber 14 and the evaluation circuit 15 in such a way that these components are not visible from the outside.

Figure 2:
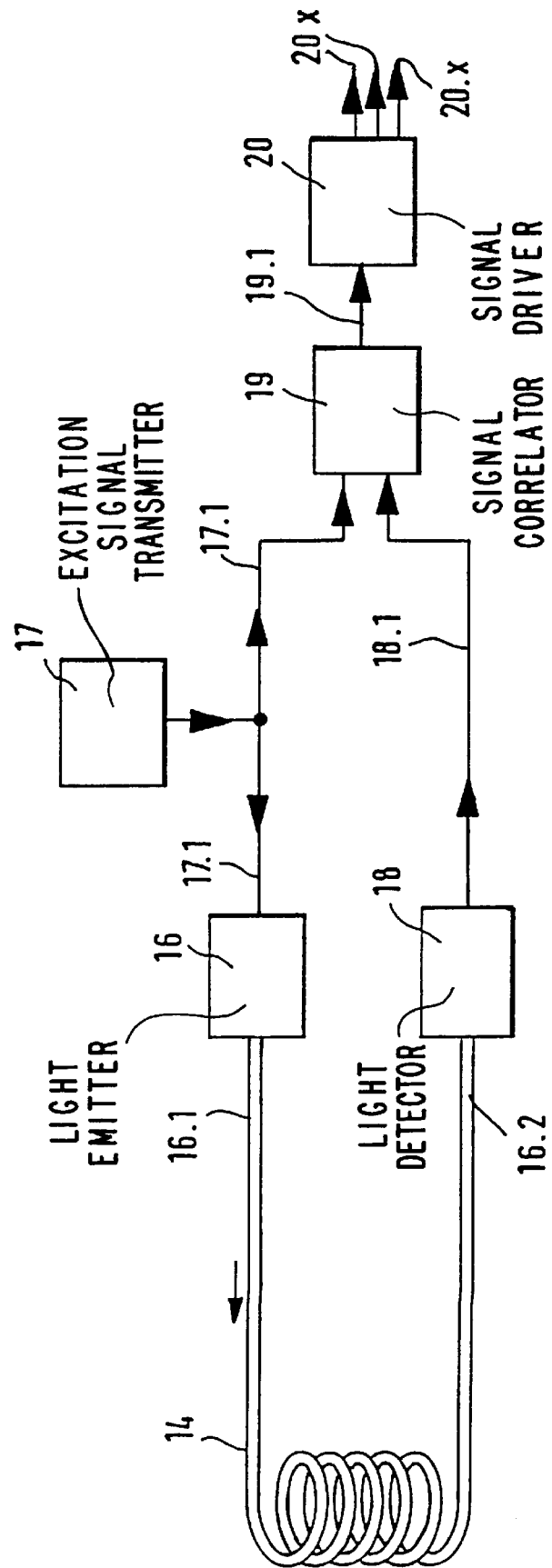
In FIG. 2, the essential components for signal generation, detection and evaluation are shown in the form of a schematic signal flow diagram.

FIG. 2 shows one of the essential components of the evaluation circuit 15, which is a transmitter 16 disposed on the first end of the optical fiber 14. An excitation signal transducer 17 for transmitting a light signal supplies this sensor 16 with a trigger signal 17.1, which travels parallel to reach a signal correlator 19. The light signal 16.1 thereupon generated by the transmitter 16 is polarized, before its entry into the optical fiber, by a polarizer, not shown, and passes along the optical fiber 14 to reach a light-sensitive pickup 18 disposed on the second, oppositely located end of the optical fiber. This pickup 18 converts the received light signal 16.2 into a response signal 18.1 and carries that signal on to the signal correlator 19. In the signal correlator 19, the trigger signal 17.1 for the transmitter and the response signal 18.1 of the pickup 18 are compared with one another. From the difference in polarization between the two signals, the signal correlator 19 generates a correlation signal 19.1, which is converted by an evaluation logic 20, following the signal correlator 19, into trigger signals 20.x for triggering vehicle-specific devices, not shown. Because of physical principles, which are described in detail in German Published, Nonexamined Patent Application DE-OS 33 11 524, the differences in polarization between the trigger signal 17.1 of the transmitter 16 and the response signal 18.1 of the pickup can be ascribed to exertions of force or pressure on the optical fiber 14. These exertions of pressure or force by the driver deform the sheath of the steering wheel 10 and thus within an infinitesimally small region deform the optical fiber 14.

It is understood that variations or advantageous refinements of the exemplary embodiment are possible without departing from the concept of the invention.

In this connection, a possible further development should be mentioned, which would make it possible to control multiple different vehicle functions by means of a single sensor on the steering wheel 11. To that end, from pressure pulses occurring in rapid succession, the evaluation circuit 15 would have to detect grip sequences with which various vehicle-specific devices are associated.

We claim:

1. A steering wheel (10), in particular for controlling a motor vehicle, having a steering wheel ring (11) extending at least part of the way around, which ring is connected to a steering wheel hub (13) by at least one steering wheel spoke (12) extending substantially radially to the steering wheel ring (11), the steering wheel (10) comprising a fiber-optical sensor with at least one optical fiber (14), on the first end of which a light-emitting transmitter (16) transmits a light signal (16.1), which a light-sensitive pickup (18) on the opposite, second end receives; that the pickup (18) directs a response signal (18.1) corresponding to the received light signal (16.2) to an evaluation circuit (15); and that the evaluation circuit (15), on the basis of the modulation between the transmitted light signal (16.1) and the received light signal (16.2) that takes place in the event of the imposition of force or pressure on the optical fiber (14), generates a driver signal (20.x), which serves to control at least one vehicle-specific device.

2. The steering wheel (10) of claim 1, wherein the at least one optical fiber (14) of the fiber-optical sensor is wound at least intermittently in coiled fashion around the steering wheel ring (11).

3. The steering wheel (10) of claim 1, wherein the at least one optical fiber (14) of the fiber-optical sensor is wound at least intermittently in coiled fashion around at least one steering wheel spoke (12).

4. The steering wheel (10) of claim 1, wherein the fiber-optical sensor is surrounded by a sheath.

5. The steering wheel (10) of claim 1, wherein the transmitter (16), the pickup (18) and the evaluation circuit (15) of the fiber-optical sensor are disposed in the steering wheel hub (13).

6. The steering wheel (10) of claim 1, wherein from a plurality of modulations in rapid succession between the emitted light signal (16.1) and the received light signal (16.2), the evaluation circuit (15) of the fiber-optical sensor detects grip sequences that are associated with various vehicle-specific devices.

7. The steering wheel (10) of claim 1, wherein one of the vehicle-specific devices is an alarm device, which responds if the driver is not grasping the steering wheel (10 when the vehicle is in motion.

8. The steering wheel (10) of claim 1, wherein one of the vehicle-specific devices is the engine fuel cycle and/or the ignition, which is interrupted whenever the driver is not grasping the steering wheel (10) when the vehicle is not in motion.

9. The steering wheel (10) of claim 1, wherein one of the vehicle-specific devices is the horn, the windshield wiper, or the lights, which are actuated by one or more successive strong pressure pulses by the driver on the steering wheel ring (11) or on at least one steering wheel spoke (12).

10. The steering wheel (10) of claim 1, wherein one of the vehicle-specific devices is a device for closed-loop control or adaptation of the desired speed of the vehicle.

* * * * *